United States Patent
Sands et al.

(10) Patent No.: US 8,253,581 B2
(45) Date of Patent: Aug. 28, 2012

(54) LOADING DEVICE WITH A MOVEABLE PLATFORM AND A PIVOTAL ARM

(75) Inventors: Jeffrey L. Sands, Freeport, IL (US); James D. Conlin, South Beloit, IL (US); Thomas J. Franken, Roscoe, IL (US); Andrew Paul Franklin, Beloit, WI (US); Randy L. Ginner, Beloit, WI (US); Ronald J. Glavan, Rockton, IL (US); Scott A. Glawe, Roscoe, IL (US); David A. Hill, Beloit, WI (US); Michael J. Newberry, Poplar Grove, IL (US); Jack Pellicane, Wyomissing, PA (US); Manuel Calzada, Rolling Meadows, IL (US); Henry Thomas Ewald, Roselle, IL (US)

(73) Assignee: Restaurant Technology, Inc., Oak Brook, IL (US)

( * ) Notice: Subject to any disclaimer, the term of this patent is extended or adjusted under 35 U.S.C. 154(b) by 8 days.

(21) Appl. No.: 10/122,635

(22) Filed: Apr. 17, 2002

(65) Prior Publication Data
US 2004/0011712 A1 Jan. 22, 2004

(51) Int. Cl.
*G08B 21/00* (2006.01)
(52) U.S. Cl. ......... 340/673; 340/676; 414/788; 209/552
(58) Field of Classification Search .................. 340/673, 340/676; 414/729.9, 78, 788; 99/355, 352, 99/339, 386; 209/552; 53/235–237, 250, 53/251
See application file for complete search history.

(56) References Cited

U.S. PATENT DOCUMENTS

| 2,281,191 | A | * | 4/1942 | Eddy et. al. ................... 221/115 |
| 4,179,985 | A | | 12/1979 | Baker et al. |
| 4,660,467 | A | | 4/1987 | Waks |
| 4,671,425 | A | | 6/1987 | Knoll |
| 5,044,264 | A | | 9/1991 | Forney |
| 5,121,677 | A | | 6/1992 | Le Claire et al. |
| 5,168,795 | A | | 12/1992 | Okada |
| 5,186,599 | A | * | 2/1993 | Fluck ........................ 414/792.9 |
| 5,227,597 | A | | 7/1993 | Dickens et al. |
| 5,245,150 | A | | 9/1993 | Grandi |
| 5,305,615 | A | | 4/1994 | McFadden et al. |
| 5,365,835 | A | * | 11/1994 | Naramura .................... 99/450.5 |
| 5,452,786 | A | | 9/1995 | Gilmore |
| 5,522,310 | A | | 6/1996 | Black, Sr. et al. |

(Continued)

FOREIGN PATENT DOCUMENTS
CA 2206425 6/1996
(Continued)

OTHER PUBLICATIONS

European Search Report Dated Jul. 25, 2003.

*Primary Examiner* — Eric M Blount
(74) *Attorney, Agent, or Firm* — Ryndak & Suri LLP

(57) ABSTRACT

A loading device includes a feeder having a cutout and a sensor. When a sensor detects that an item is positioned in the cutout, a motor slides the feeder out of a first component to remove the item from the first component for delivery to a second component. Alternatively, the loading device is a pivotal arm which pivots to slide the item out of the first component.

21 Claims, 2 Drawing Sheets

U.S. PATENT DOCUMENTS

| | | |
|---|---|---|
| 5,555,793 A | 9/1996 | Tocchet et al. |
| 5,566,856 A | 10/1996 | Fallen et al. |
| 5,722,315 A * | 3/1998 | Naramura ........................ 99/349 |
| 5,802,958 A | 9/1998 | Hermansson |
| 5,878,910 A | 3/1999 | Gibernau et al. |
| 6,220,424 B1 * | 4/2001 | Fluck .......................... 198/468.6 |
| 7,281,468 B2 | 10/2007 | Frem |
| 7,329,394 B2 | 2/2008 | Weselak et al. |
| 2002/0005122 A1 | 1/2002 | Schultheis |

FOREIGN PATENT DOCUMENTS

| | | |
|---|---|---|
| EP | 0406475 | 1/1991 |
| EP | 0455477 | 11/1991 |
| JP | 53 111798 | 9/1978 |
| JP | 62-132034 | 8/1987 |
| JP | 63-11440 | 1/1988 |
| JP | 63-100428 | 6/1988 |
| JP | 03 236878 | 10/1991 |
| JP | 4-164414 | 10/1992 |
| JP | 07-048034 | 2/1995 |
| JP | 09 223268 | 8/1997 |
| SE | 513 106 | 7/2000 |
| WO | WO 96/16584 | 6/1996 |
| WO | WO 2004/052761 | 6/2004 |

* cited by examiner

LOADING DEVICE WITH A MOVEABLE PLATFORM AND A PIVOTAL ARM

BACKGROUND OF THE INVENTION

The present invention relates generally to a loading device used to transfer an item, such as frozen food, from a moveable platform in a first component to a second component in response to a request for the item.

When preparing food for service, the food is commonly moved from a freezer component to the preparation area manually. For example, when preparing frozen food for service, such as hamburger patties, the food is usually manually transferred from a freezer component to a cooking component by the food preparer.

A drawback to manually transferring the food from the freezer component to the cooking component is that manual labor by the employee is required. The employee must remove the frozen food and transport the food to the cooking component for cooking.

It would be desirable to employ a loading device which automatically transfers the frozen food from the freezer component to the cooking component in response to a signal requesting the food.

SUMMARY OF THE INVENTION

A loading device is used to transport an item from a first component to a second component in response to a request for the item.

An example loading device includes a feeder moveable by a motor having a cutout which extends partially through the feeder. A sensor is located at the upper surface of the cutout. When a request to transfer an item to the second component is received, a platform in the first component is raised to position the item in the cutout. When the sensor senses the item, the motor moves the feeder. The item drops from the cutout and into the second component.

An alternative loading device includes an arm pivotal about a pivot point. The arm includes a pusher having an angled edge. When a sensor proximate to the arm detects that an item is located in the loading device, the arm rotates about the pivot point. The angled edge engages the item, the pusher sliding under the item. As the arm continues to pivot, the item is pushed out of the first component and into the second component.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
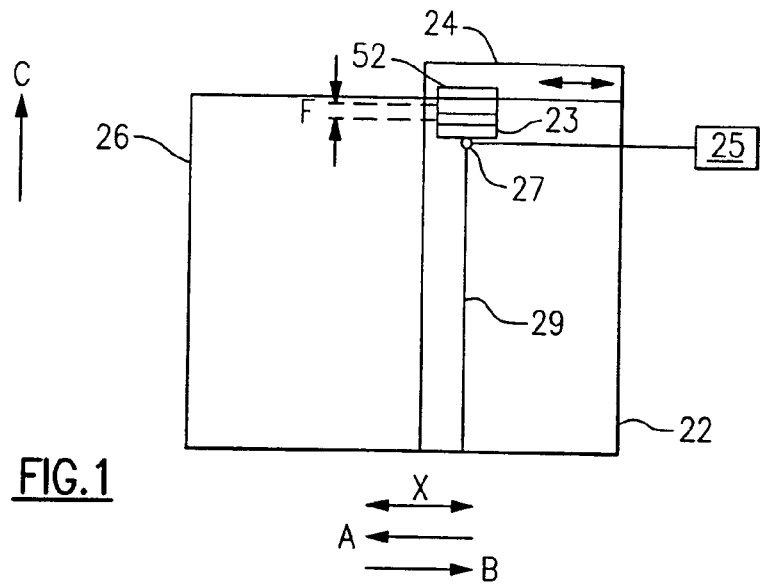
FIG. 1 schematically illustrates a block diagram of a loading device transporting an item from a first component to a second component.

As shown schematically in FIG. 1, a loading device 24 is employed to transport items 52 from a first component 22 to a second component 26 in response to a request for an item 52. In one example, the first component 22 is a freezer component and the second component 26 is a cooking component, and the loading device 24 is used to transfer an item 52, such as food.

Figure 2:
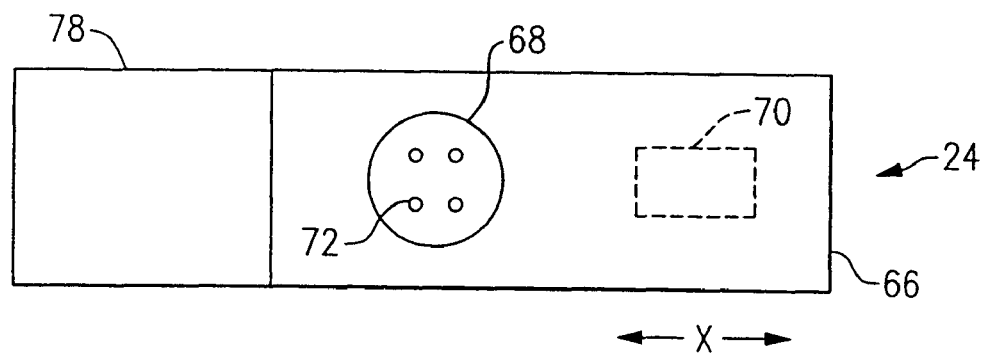
FIG. 2 schematically illustrates a top view of the loading device.
Figure 3:
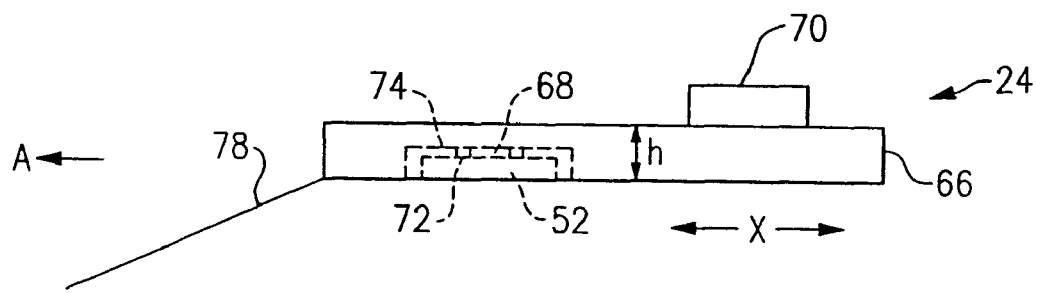
FIG. 3 schematically illustrates a side view of the loading device in a loading position.
Figure 4:
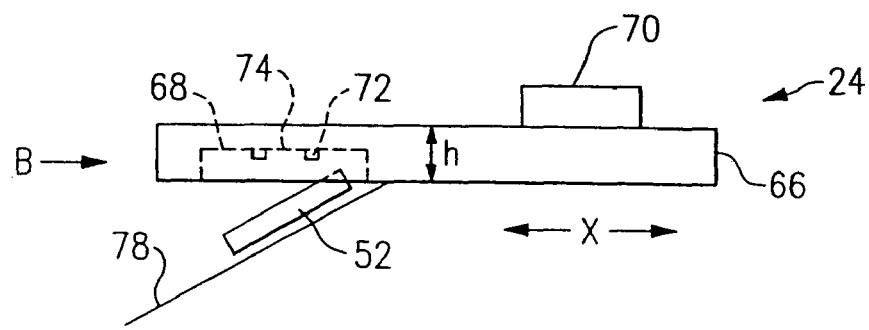
FIG. 4 schematically illustrates a side view of the loading device in a delivery position.

An example loading device 24 is schematically illustrated in FIGS. 2 to 4. The illustrated loading device 24 includes a feeder 66 moveable in the X direction (i.e., right and left according to FIGS. 2 to 4) by a motor 70. The feeder 66 includes a cutout 68 extending partially through the height h of the feeder 66. Preferably, the cutout 68 is the same shape as the item 52. A sensor 72 is located at the upper surface 74 of the cutout 68.

FIG. 3 illustrates the feeder 66 in the loading position. When an item 52 is moved into the cutout 68 and the sensor 72 detects that the item 52 is located in the cutout 68, the motor 70 moves the feeder 66 in direction A (i.e., to the left in FIG. 2) to the delivery position, as shown in FIG. 3. The item 52 drops from the cutout 68 and is transported down a ramp 78 and into the second component 26. The motor 70 then moves the feeder 66 in direction B (i.e., to the right in FIG. 3) to return the feeder 66 to the loading position. If the items 52 are stuck together, the motor 70 provides enough force to separate the items. For example, if the items 52 are frozen food, they may be frozen together. The motor 70 provides enough force to separate the frozen food items 52.

Returning to FIG. 1, the first component 22 includes a platform 23 which is moveable in the direction C (i.e., up according to FIG. 1) in response to a signal. When an item 52 is to be transferred to the second component 26, a controller 25 sends a signal to the platform 23 to move the platform in the direction C. The platform 23 is moved upwardly by a motor 27 an amount substantially equal to the height f of the item 52. In one example, the platform 23 is guided by a track 29. When the sensor 72 detects that an item 52 is located in the cutout 68, the feeder 66 moves in direction A from the loading position to the delivery position (i.e., to the left in FIG. 1), removing the item 52 from the first component 22. When the feeder 66 is in the delivery position, the item 52 drops from the feeder 66 and into the second component 26. The feeder 66 then moves in the direction B to return to the loading position (i.e., to the right in FIG. 1).

A plurality of feeders 66 can also be employed. During high demand times, all of the feeders 66 can operate simultaneously. As the sensors 72 in plurality of feeders 66 are triggered the feeders 66 slide in direction A to the delivery position, allowing for a plurality of items 52 to be delivered to the second component 26 at once. Alternatively, the plurality of feeders 66 can be operated alternately.

Figure 5:
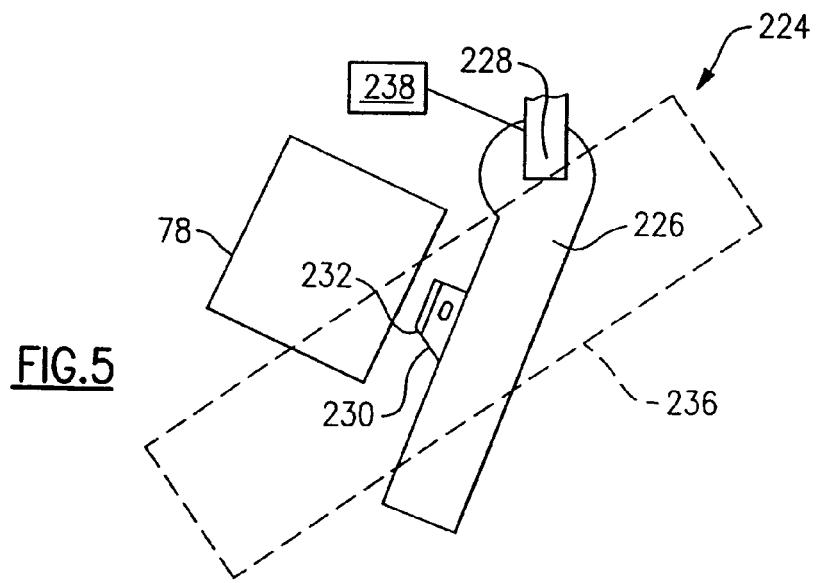
FIG. 5 schematically illustrates a top view of an alternative example of a loading device.
Figure 6:
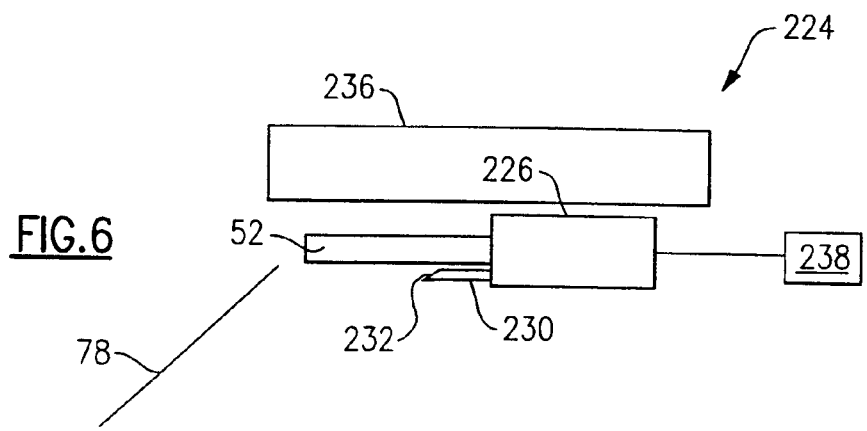
FIG. 6 schematically illustrates a side view of the alternative example of the loading device of FIG. 5.

FIGS. 5 and 6 illustrate an alternative example of the loading device 224 including an arm 226 pivotal about pivot point 228. The arm 226 includes a pusher 230 having an angled edge 232. When a sensor 238 proximate to the arm 226 detects that an item 52 is located proximate to the loading device 224 and ready for loading, the arm 226 rotates about the pivot point 228. The angled edge 232 engages the item 52, the pusher 230 sliding under the item 52. If the items 52 are stuck together, the pusher 230 breaks apart the items 52. A beam 236 over the arm 226 provides an upper boundary for the item 52 while the pusher 230 slides under the item 52. As the arm 226 continues to pivot, the item 52 is pushed out of the first component 22 and into the second component 26 (shown in FIG. 1).

The loading device 24 of the present invention can be used with an automated grill, such as described in co-pending patent application Ser. No. 10/124,629 entitled "Automated Grill" filed on Apr. 17, 2002.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A loading device for moving at least one item, the loading device comprising:
   a platform for holding the at least one item, and the platform is moveable in a first direction in response to a signal;
   a sensor; and
   a moving device moveable in a second direction substantially perpendicular to the first direction, and the moving device moves in the second direction when the sensor detects the at least one item to move the at least one item from the platform, wherein the moving device is a feeder including an opening positioned to receive the at least one item and the sensor is located in the opening.

2. The loading device as recited in claim 1 wherein the feeder moves from a loading position to a delivery position when the sensor detects the at least one item in the opening of the feeder.

3. The loading device as recited in claim 1 wherein the feeder has a height, and the opening extends partially through the height of the feeder.

4. The loading device as recited in claim 1 wherein the opening has an opening size and the at least one item has an item size substantially equal to the opening size.

5. The loading device as recited in claim 1 further including a motor that moves the loading device in response to the signal.

6. The loading device as recited in claim 1 further including a controller, and the signal is sent by the controller.

7. A loading device for moving at least one item, the loading device comprising:
   a platform for holding the at least one item, and the platform is moveable in a first direction in response to a signal;
   a sensor; and
   a moving device moveable in a second direction substantially perpendicular to the first direction, and the moving device moves in the second direction when the sensor detects the at least one item to move the at least one item from the platform wherein the moving device includes a pivotal arm that pivots when the sensor detects the at least one item proximate to the pivotal arm and the pivotal arm further includes a projection, and the projection is below the at least one item as the pivotal arm moves the at least one item.

8. The loading device as recited in claim 7 wherein the projection further includes an angled edge.

9. A method for transferring at least one item comprising:
   requesting the at least one item;
   positioning the at least one item proximate to a sensor in response to the requesting by moving the at least one item in a first direction;
   sensing the at least one item by the sensor; and
   transferring the at least one item from a freezer to a grill in a second direction in response to the sensing, and the second direction is substantially perpendicular to the first direction.

10. The loading device as recited in claim 1 wherein the signal is a request for the at least one item.

11. A loading device for moving at least one item, the loading device comprising:
    a platform for holding the at least one item, and the platform is moveable in a first direction in response to a signal;
    a sensor; and
    a moving device moveable in a second direction substantially perpendicular to the first direction, and the moving device moves in the second direction when the sensor detects the at least one item to move the at least one item from the platform wherein the moving device moves in the second direction to transfer the at least one item from a freezer component to a grill component, and the platform is in the freezer component.

12. The loading device as recited in claim 1 wherein the platform is moveable in a vertical direction and the moving device is moveable in a horizontal direction.

13. The loading device as recited in claim 1 wherein the at least one item is received in the opening.

14. A loading device for moving at least one item, the loading device comprising:
    a platform for holding the at least one item, and the platform is moveable in a first direction in response to a signal;
    a sensor; and
    a moving device moveable in a second direction substantially perpendicular to the first direction, and the moving device moves in the second direction when the sensor detects the at least one item to move the at least one item from the platform further including a freezer and a grill, and wherein the platform is moveable in the freezer in a vertical direction, and the loading device moves the at least one item in a horizontal direction from the platform in the freezer to the grill, and the grill includes a conveyor belt moveable in a grill direction substantially parallel to the vertical direction.

15. The method of claim 9 wherein positioning comprises positioning the at least one item into an opening and the transferring comprises moving the opening.

16. The method of claim 15 wherein the sensor is located in the opening and the sensing by the sensor senses that the at least one item is in the opening.

17. The method of claim 15 wherein the transferring comprises transferring by a feeder, the feeder having a height and the opening extends partially through the height of the feeder.

18. The method of claim 9 wherein positioning comprises positioning the at least one item into an opening having an opening size and the at least one item has an item size substantially equal to the opening size.

19. The method of claim 9 wherein transferring comprises rotating a pivotal arm.

20. The method of claim 19 wherein the pivotal arm comprises a projection and the method further comprises sliding the projection below the at least one item.

21. The method of claim 19 wherein the pivotal arm comprises an angled edge and the method further comprises separating the at least one item from another item by the angled edge.

* * * * *